Sept. 16, 1947.          C. S. ASH          2,427,378
VEHICLE WHEEL
Filed March 17, 1945          3 Sheets-Sheet 3
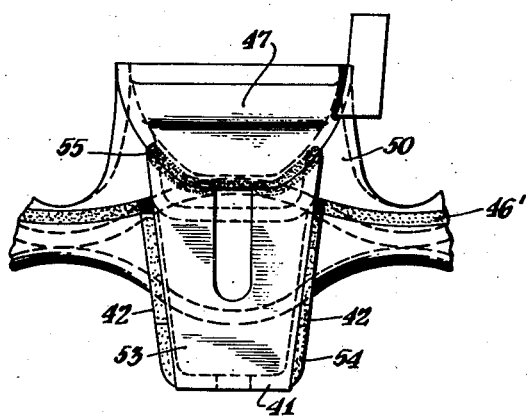
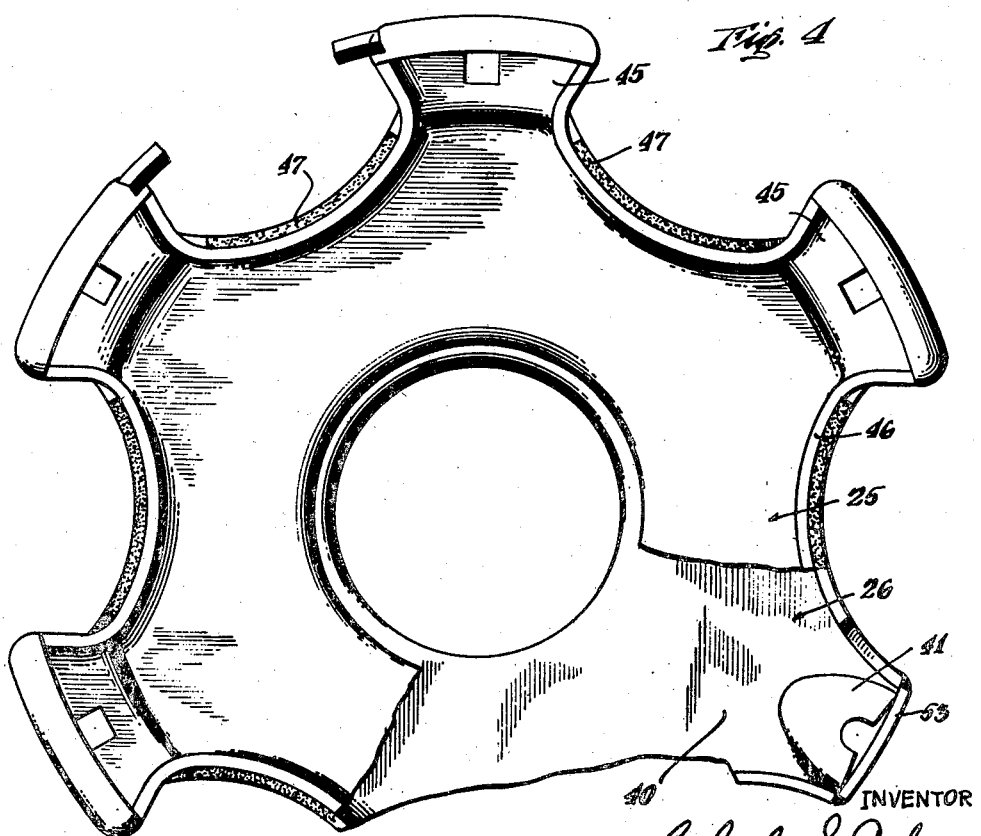

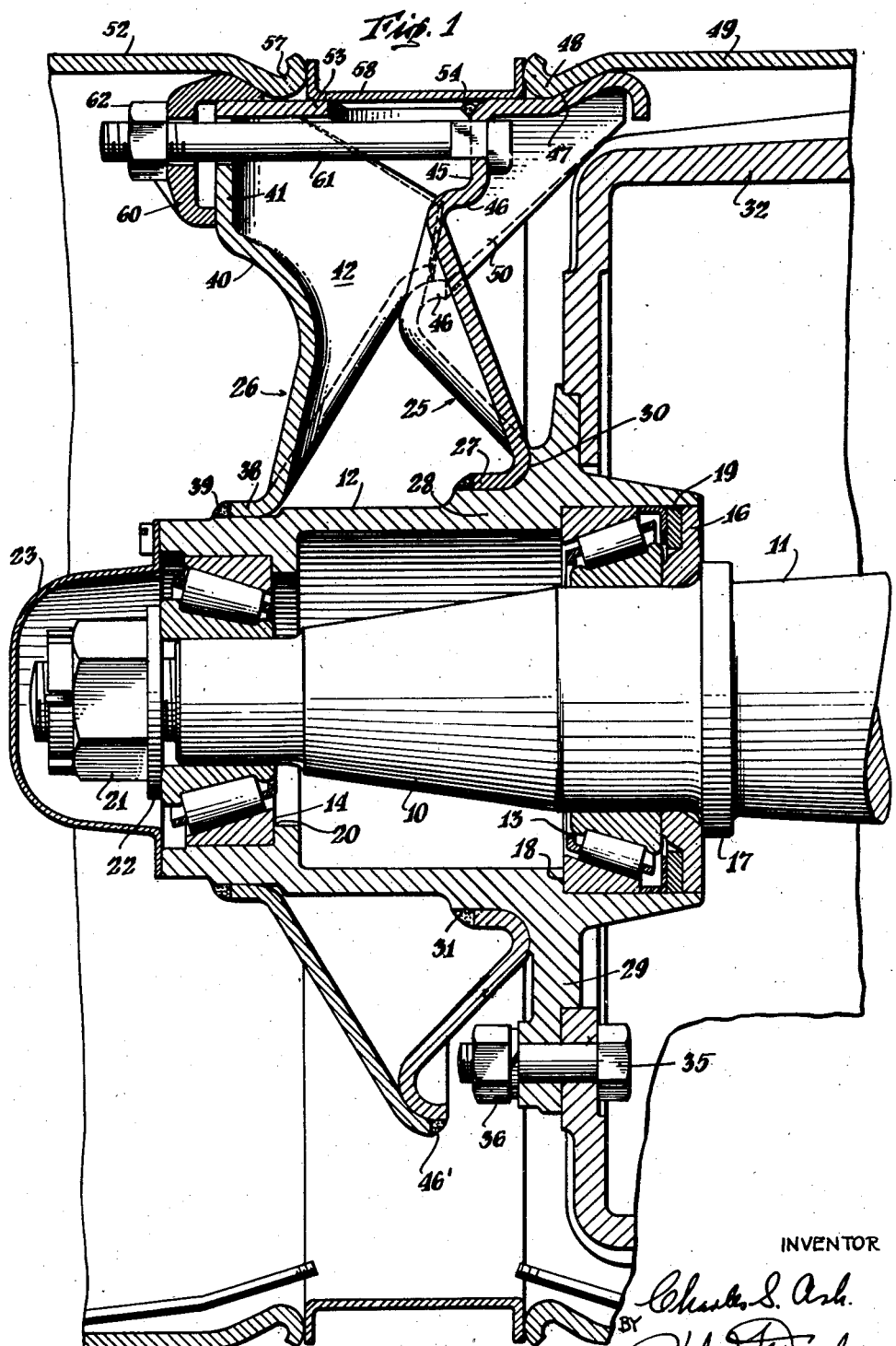

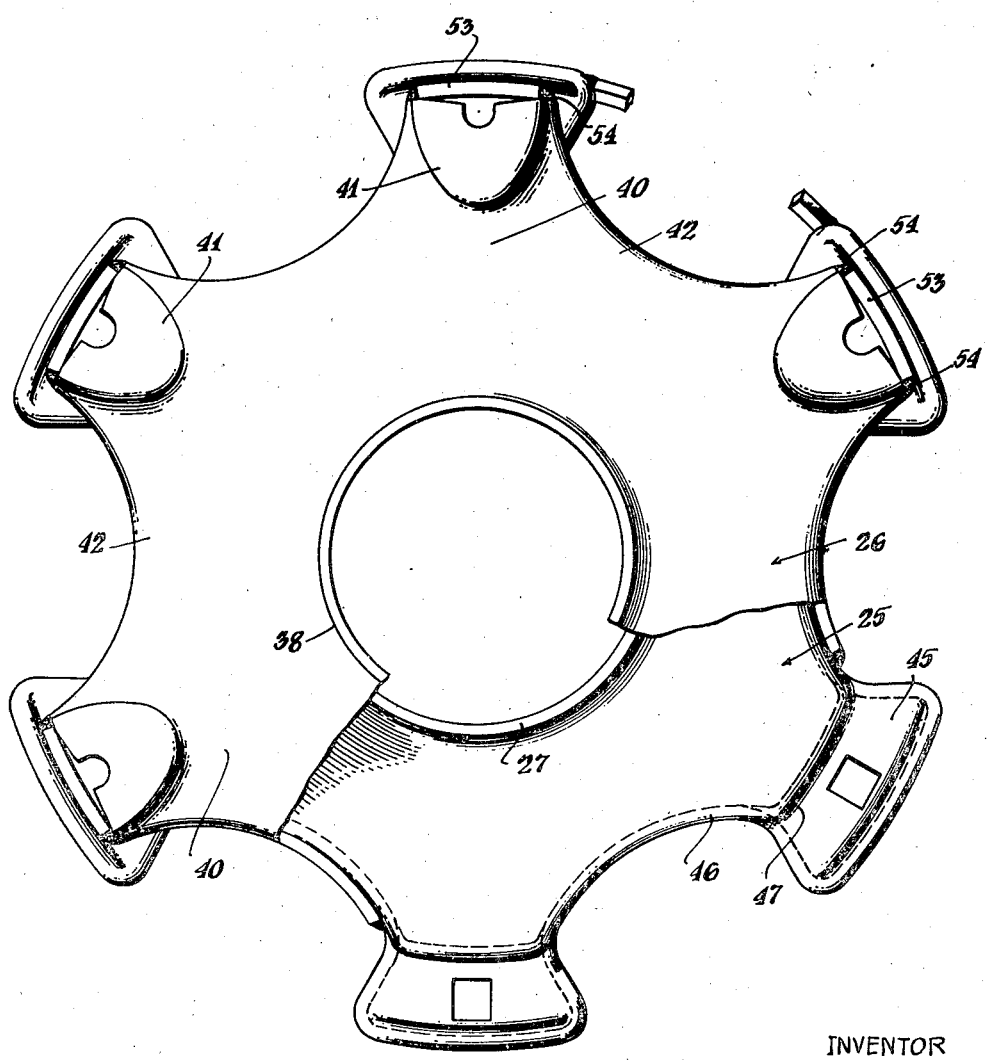

Patented Sept. 16, 1947

2,427,378

UNITED STATES PATENT OFFICE 2,427,378

VEHICLE WHEEL

Charles S. Ash, Milford, Mich.

Application March 17, 1945, Serial No. 583,368

7 Claims. (Cl. 301—36)

The present invention relates to vehicle wheels and more particularly to vehicle wheels adapted to carry a plurality of road engaging elements.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a vertical cross sectional view of a typical and illustrative embodiment of the wheel of the present invention;

Fig. 2 is a side elevational view of the wheel shown in Fig. 1 looking inwardly, with certain parts broken away for greater clarity;

Fig. 3 is a top elevational view of one of the spoke end assemblies of the wheel shown in Fig. 1; and Fig. 4 is another side elevational view of the wheel shown in Fig. 1 looking outwardly, certain parts also being broken away for greater clarity.

The present invention provides an improved vehicle wheel adapted to support a plurality of road engaging elements as, for instance, a pair of pneumatic tires of conventional type. The invention further provides such a wheel of strong and durable construction which may be depended upon to carry safely very heavy loads. A further object of the invention is the provision of a dual wheel structure which is simple in design, economical to fabricate and of entirely sufficient strength for heavy duty work. Still another object of the invention is the provision of a wheel of the desirable characteristics set forth in the foregoing objects upon which may be demountably mounted conventional tire carrying rims.

With the stated and other objects in view there is provided in an illustrative embodiment of the wheel of the prevent invention an elongated substantially cylindrical hub upon which are mounted in axially spaced apart relationship a pair of outwardly radially extending webs for supporting dual duplicate tire rims. Each of the webs is so formed as to provide integral spoke portions which extend radially outwardly from an inner disc portion. The radially inner or disc portions of the two webs cooperate to form a unitary structure being curved toward each other at their substantially arcuate peripheries between the spokes. At these peripheries the outer web is axially inwardly curved over the inner web, which also curves axially inwardly, and the peripheries are securely joined. The integral spoke portions of each web are positioned axially in line with corresponding spokes of the other web and axially spaced therefrom. The spokes of each web are strongly and integrally made in an open box form having substantially axially disposed strengthening webs between their lateral faces and the disc portions of the webs which have been described as curved toward each other and joined. The spokes of the inner web are turned inwardly at their ends to form integral inclined seats for a conventional tire rim having an inclined seat or bead for the purpose, and an axially extending plate is provided between the end of each outer web spoke to each corresponding inner web spoke and is securely attached to each. These plates provide seats for another rim which may be a duplicate of the inner rim, and also serve to securely join the corresponding spokes of the webs and strengthen the assembled wheel. A spacing ring between the duplicate rims and lugs with inclined rim engaging surfaces on the outer spokes completes the dual demountable rim assembly.

It will be understood that the foregoing general description and the following detailed description as well are exemplary and explanatory of the invention but are not restrictive thereof.

Referring now in detail to the illustrative embodiment of the invention shown in the accompanying drawings, and referring to Fig. 1, the wheel of the present invention is shown as mounted on the reduced end or spindle 10 of a vehicle axle 11. The wheel proper comprises a substantially cylindrical hub 12 mounted by means of inner and outer roller bearings 13 and 14 respectively for free rotation upon spindle 10. As shown the inner bearing 13 is seated in a radially enlarged portion at the inner end of hub 12 against an annular bearing plate 16 which is positioned against a shoulder 17 of axle 11. The bearing 13 is held at its other end against a shoulder 18 of the hub, and a packing ring 19 may be interposed between the bearing and ring 16 to exclude dust and moisture. The outer roller bearing 14 seats against another shoulder 20 in the hub, and the bearing and hub assembly is retained on the axle by means of a nut 21 and washer 22. A hub cap 23 is preferably provided over the end of the assembly for bearing protection.

Mounted on the exterior substantially cylindrical surface of hub 12 are inner and outer web members 25 and 26 respectively. As shown, the inner web 25 is turned outwardly at its inner periphery to form an integral cylindrical portion 27 which is closely fitted to and seated on a somewhat thickened portion 28 of hub 12. Portion 28 of the hub merges with an integral outwardly radially extending flange 29, and between the two there is provided a curved surface 30 against which the inner web 25 seats with a similarly curved surface formed between the web and its cylindrical portion 27. A circular line of welding 31 securely joins the web 25 to hub 12. A brake drum 32 of generally conventional type may be provided secured to flange 29 by means of a plurality of bolts 35 and nuts 36.

The outer web 26 of the wheel is also outwardly turned at its inner periphery in a cylindrical portion 38 to fit closely on a smooth exterior surface of hub 12, and the two are securely joined by a circular line of welding 39 at the end of cylindrical portion 38. The webs 25 and 26 may be castings or stampings and are preformed for assembly on the hub 12. They are preferably fabricated for a very close or press fit for their cylindrical portions 27 and 38 on the surface of the hub.

Each of the webs is formed to provide a plurality of integral outwardly radially extending spokes upon which tire carrying rims may be mounted and a plurality of other portions between the spokes which curve toward the other web are secured thereto. As shown, the outer web 26 has spoke portions 40 curving outwardly and terminating in substantially radially extending portions 41 for seating a rim lug as hereinafter described. Between the spokes 40 web 26 curves axially inwardly toward corresponding portions of the inner web, and these portions of the web have smoothly curved edges between spokes to form a scalloped outer periphery for the web, as shown in Fig. 2. It will be noted that the portions of web 26 beneath each spoke 40 are substantially radial for the entire distance between the spokes and cylindrical portion 38, while the portions of the web beneath and between the spokes curves axially inwardly at a substantial angle directly from the cylindrical portion 38 to the scalloped periphery. This construction provides a strong body formation for the wheel capable of withstanding stresses in any direction. As shown most clearly in Fig. 3, the spokes 40 are reinforced by substantially axially disposed integral web portions 42 extending between the spokes and the axially offset adjoining portions of the web between the spokes.

The inner web 25 of the wheel is formed similarly to the outer web, terminating in a plurality of radially extending spokes 45. As before, the portions of the web immediately beneath the spokes extends substantially radially entirely to cylindrical portion 27, while between the spokes the web is substantially axially outwardly curved, terminating in a reversed, inwardly curved portion 46 over which the scalloped periphery of the outer web 26 is lapped. The correspondingly formed scalloped outer peripheries of the webs 25 and 26 are joined throughout the distances between the spokes by curved lines of welding 46' to form a strong lap weld.

Immediately beneath each spoke 45 the inner web 25 is abruptly inwardly curved as shown at 46 for greater strength, and the spokes then extend substantially radially outwardly to their ends where another inner curve is formed to provide substantially plane surfaces 47 at the tops of the spokes. The surfaces 47 are radially outwardly tapered to provide a seat for the annular bead 48 of a conventional type tire rim 49. As in the outer spoke construction, the inner spokes 45 are formed with substantially axially disposed web portions 50 extending from the spokes to the curved periphery of web 25 between the spokes.

As a seat for an outer tire rim 52 which is preferably a duplicate of rim 49, there is provided a wedge shaped plate 53 over the end of each spoke 40 firmly seated on the top of portion 41 of the spoke and the upper edges of web portions 42. The plates are welded as at 54 (Fig. 2) to the ends of spokes 40, and extend axially inwardly to the outer edges of spokes 45 of the inner web, abutting these spoke ends in a curved line along which the members are joined by welding as at 55 (Fig. 3). The plates thus serve to join the corresponding spokes of the webs 25 and 26 to strengthen the wheel assembly, and also as a seat for the annular bead 57 of rim 52. A spacing ring 58 is provided between the duplicate rims 49 and 52, and lugs 60 on mounting bolts 61 hold the assembled dual rims on the wheel. Bolts 61 also extend between the spokes and serve to strengthen the wheel when nuts 62 are in place and tightened.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a hub member, a pair of web elements secured to said hub member in axially spaced apart relationship, each said element terminating at its outer periphery in outwardly radially extending spokes substantially axially aligned with corresponding spokes of the other element, said elements between said spokes being axially curved toward and secured to each other, and a plate member extending between the corresponding spokes of each web element and secured thereto.

2. A vehicle wheel comprising, in combination, a hub member, an inner and an outer web element each secured at its inner periphery to said hub member in spaced apart relationship to the other web element, each said web element terminating at its outer periphery in outwardly radially extending spokes substantially axially aligned with corresponding spokes of the other element, said elements between said spokes being axially curved toward and secured to each other, and a plate member over the end of each spoke of the outer web element and extending to the outer edge of each corresponding spoke of the inner web element and secured to each spoke.

3. A vehicle wheel comprising, in combination, a hub member, inner and outer web elements secured at their inner peripheries to said hub member in spaced apart relationship, each said web member terminating at its outer periphery in outwardly radially extending integral spokes axially spaced apart from and in substantial axial alignment with corresponding spokes of the other web element, the spokes of the inner web element being inwardly turned at their ends to form integral axially disposed rim supporting surfaces, and a plate over the end of each outer web element spoke providing a rim supporting surface each said plate being axially disposed and extending to the outer axial edge of said rim supporting surface of the corresponding inner web element spoke, said plates being secured to said inner and outer web element spokes.

4. A vehicle wheel comprising, in combination, a hub member, and a pair of web elements each secured at its inner periphery to said hub member in spaced apart relationship to the other web element, each said element terminating at its outer periphery in outwardly radially extending integral spokes, said web elements between said spokes being axially curved toward each other at their portions nearer the hub member and axially curved in the same direction and lapping at their portions more remote from said hub member and secured together at said lapping portions.

5. A vehicle wheel comprising, in combination, a hub member and an inner and an outer web element each said element secured at its inner periphery to said hub member in spaced apart relationship to the other web element, said elements terminating at their outer peripheries in outwardly radially extending integral spokes, said inner web element between said spokes being axially outwardly curved at its portion nearer said hub member and reversely curved at its peripheral portion more remote from said hub member and said outer web elements being axially inwardly curved between said spokes and lapping said reversely curved peripheral portion of said inner web element and secured thereto.

6. A vehicle wheel comprising, in combination, a hub member, and a pair of web elements each secured at its inner periphery to said hub member in spaced apart relationship to the other, said elements terminating at their peripheries in a plurality of outwardly radially extending spokes, said elements at their portions between said spokes being axially curved toward each other and joined, and said elements at their portions beneath said spokes between the spokes and the hub member having less axial curvature than said portions between said spokes.

7. A vehicle wheel comprising, in combination, a hub member, and a pair of web elements each secured at its inner periphery to said hub member in spaced apart relationship to the other, said elements terminating at their outer peripheries in a plurality of outwardly radially extending integral spokes, said elements at their portions between said spokes being axially curved toward each other and joined, and substantially axially disposed integral strengthening ribs between each lateral edge of each said spoke and the adjacent said axially curved portion between spokes.

CHARLES S. ASH.

REFERENCES CITED

The following references are of record in the file of this patent:

UNITED STATES PATENTS

| Number | Name | Date |
|---|---|---|
| 1,520,810 | Copithorn | Dec. 30, 1924 |
| 2,152,757 | Burger | Apr. 4, 1939 |
| 2,051,498 | Short | Aug. 18, 1936 |
| 1,347,183 | Smith | July 20, 1920 |

FOREIGN PATENTS

| Number | Country | Date |
|---|---|---|
| 407,920 | France | Mar. 1910 |
| 83,125 | Austria | Mar. 10, 1921 |